(12) United States Patent
Koeck

(10) Patent No.: US 7,600,982 B2
(45) Date of Patent: Oct. 13, 2009

(54) COMPACT HELICAL COMPRESSOR FOR MOBILE USE IN A VEHICLE

(75) Inventor: Engelbert Koeck, Planegg (DE)

(73) Assignee: KNORR-BREMSE Systeme fuer Schienenfahrzeuge GmbH, Munich (DE)

( * ) Notice: Subject to any disclaimer, the term of this patent is extended or adjusted under 35 U.S.C. 154(b) by 91 days.

(21) Appl. No.: 11/812,055

(22) Filed: Jun. 14, 2007

(65) Prior Publication Data

US 2008/0044307 A1 Feb. 21, 2008

Related U.S. Application Data

(63) Continuation of application No. PCT/EP2005/013356, filed on Dec. 13, 2005.

(30) Foreign Application Priority Data

Dec. 14, 2004 (DE) ............... 10 2004 060 417

(51) Int. Cl.
- *F04B 49/00* (2006.01)
- *F04B 47/08* (2006.01)
- *F01C 5/00* (2006.01)
- *F01D 1/24* (2006.01)

(52) U.S. Cl. .......... 417/46; 417/43; 417/375; 417/379; 417/390; 418/48; 418/201.1; 418/220

(58) Field of Classification Search ......... 417/43, 417/46, 379, 390; 418/55.1, 201, 1, 220
See application file for complete search history.

(56) References Cited

U.S. PATENT DOCUMENTS

| | | | |
|---|---|---|---|
| 3,811,805 A | 5/1974 | Moody, Jr. et al. | |
| 4,563,138 A | 1/1986 | Hofmann et al. | |
| 4,799,865 A | 1/1989 | Oscarsson | |
| 5,287,708 A * | 2/1994 | Hiramatsu et al. | 62/323.1 |
| 5,653,585 A * | 8/1997 | Fresco | 418/100 |
| 6,604,911 B2 | 8/2003 | Pauwels | |
| 6,672,102 B1 * | 1/2004 | Huenniger et al. | 62/472 |
| 2002/0048521 A1 | 4/2002 | Achtelik et al. | |
| 2004/0173379 A1 | 9/2004 | Leppanen | |

FOREIGN PATENT DOCUMENTS

| | | |
|---|---|---|
| CH | 559 117 A5 | 2/1975 |
| DE | 31 49 245 A1 | 6/1983 |
| DE | 34 22 398 A1 | 12/1985 |
| DE | 40 33 154 C1 | 1/1992 |
| DE | 20 2004 003 532 U1 | 5/2004 |
| EP | 1 156 213 A1 | 11/2001 |
| JP | 2004-211568 A | 7/2004 |

(Continued)

OTHER PUBLICATIONS

Beitz, W. et al., Dubbel, Taschenbuch fuer den Maschinenbau, 1987, Springer Verlag, Berlin, XP002373039, p. G66, col. G68.

(Continued)

*Primary Examiner*—Charles G Freay
*Assistant Examiner*—Patrick Hamo
(74) *Attorney, Agent, or Firm*—Crowell & Moring LLP

(57) ABSTRACT

A compact helical compressor system for mobile use in vehicles is described. The system includes a helical compressor unit, a motor unit dedicated to the helical compressor unit for driving the helical compressor unit, and a control unit for adjusting a rotational speed of the motor unit and to generate a predefined discharge rate of compressed air from the helical compressor unit, independently of a drive assembly of the vehicle.

6 Claims, 2 Drawing Sheets

FOREIGN PATENT DOCUMENTS

WO    WO 02/070291 A1    9/2002

OTHER PUBLICATIONS

International Search Report dated Jul. 4, 2006 w/English translation (ten (10) pages).

Form PCT/IPEA/409 w/two (2) pages of Supplemental Sheets in English for a total of (ten(10 pages).

Translation of Form PCT/IPEA/409 (Five (5) Pages).

* cited by examiner

COMPACT HELICAL COMPRESSOR FOR MOBILE USE IN A VEHICLE

CROSS REFERENCE TO RELATED APPLICATIONS

This application is a continuation of PCT International Application No. PCT/EP2005/013356, filed Dec. 13, 2005, which claims priority under 35 U.S.C. § 119 to German Patent Application No. 10 2004 060 417.7, filed Dec. 14, 2004, the entire disclosures of which are herein expressly incorporated by reference.

BACKGROUND AND SUMMARY OF THE INVENTION

The present invention relates to a compact helical compressor for mobile use in a motor vehicle including a helical compressor unit which is driven by a motor unit.

In vehicle technology, helical compressors are used wherever, despite restricted space being available, compressed air has to be generated in order to supply a compressed air onboard system. The design principle of a helical compressor is inherently suitable for a particularly compact design, and is described, for example, in German patent document DE 34 22 398.

From the general prior art it is known that the helical compressors which are used in vehicles, such as commercial or utility vehicles or rail vehicles, are driven by the drive assembly of the vehicle, for example by a diesel engine. This can be done by directly coupling a helical compressor unit to this motor unit as is described, for example, in U.S. Pat. No. 3,811,805. Alternatively, it is also possible to provide a transmission with a fixed transmission ratio between the drive assembly of the vehicle, i.e. the motor unit, and the helical compressor unit. Such a transmission usually includes a V-belt transmission.

A disadvantage of this conventional design is that the discharge rate of compressed air which is generated by the helical compressor unit is dependent on the rotational speed of the drive assembly of the vehicle. Therefore, the discharge rate of the helical compressor unit drops when the drive assembly rotates less quickly, that is to say for example if the vehicle is braked. Conversely, the discharge rate of the helical compressor unit rises with a rising rotational speed of the drive assembly, for example if the vehicle is accelerated. As a result of this, it is possible to encounter the problem that at operating points at which there is a high demand for compressed air for the vehicle (for example when braking) only a low output rotational speed of the drive assembly is available for generating a corresponding discharge volume of compressed air, and it is not possible to ensure that compressed air is provided in accordance with demand.

In order to solve this problem, attempts have previously been made to equip the compressed air system of a vehicle with sufficiently large storage containers for compressed air, from which the necessary compressed air is made available at demand peaks. However, this solution has the disadvantage that such compressed air containers require a correspondingly large installation volume in the vehicle, which runs counter to the objective of a compressed air system which is as compact overall as possible.

The present invention provides a compact helical compressor for mobile use in a vehicle whose discharge rate of compressed air is largely independent of the fluctuating rotational speed of the drive assembly.

In one exemplary embodiment, a compact mobile helical compressor is provided, driven by a dedicated motor unit assigned solely to the compressor, to generate a discharge rate of compressed air independent of the vehicle drive assembly. The subsequent specification and claims will describe additional embodiments of the invention.

The invention in one exemplary embodiment describes that the rotational speed of the motor unit, which is assigned solely to the helical compressor unit, can be adjusted in accordance with a control unit in such a way that the helical compressor unit generates a predefined discharge rate of compressed air independently of the drive assembly of the vehicle.

The advantage of the drive of the helical compressor which, according to an exemplary embodiment of the invention, can be controlled in accordance with demand is that even at operating points at which there is a high demand for compressed air but with only a low output rotational speed of the drive assembly of the vehicle being available, a sufficient discharge rate of compressed air can be generated. It is thus possible to dispense with additional large compressed air containers.

By using the control unit according to the invention, it is possible to adjust the discharge rate, and thus the power consumption of the helical compressor according to the invention precisely to the requirements of a suitable motor unit, and to adapt to changing requirements during operation at any time without further retrofitting of mechanical components, as is necessary, for example, when changing over the use of buses in public transport between town center mode and suburban mode.

The motor unit which exclusively drives the helical compressor unit can be embodied in the manner of a hydraulic drive or in the manner of an electric motor. The decisive factor in the selection of the motor unit within the scope of the present invention is that it is suitable as an actuator element within the scope of the demand-oriented rotational speed controller described here.

The use of the controllable hydraulic drive permits energy-saving deactivation of the helical compressor according to the invention, without necessitating coupling elements which are subject to wear, merely by changing the pivot angle on the hydraulic pump of the hydraulic drive, initiated by the control unit.

The controllable hydraulic drive is preferably composed of a hydraulic motor which is connected directly by flanges to the helical compressor unit and which an adjustable hydraulic pump supplies with pressure medium necessary for operation, wherein the adjustable hydraulic pump is actuated by the control unit. As an alternative to the noncontrollable hydraulic motor on the helical compressor unit, it is possible also to provide a controllable hydraulic motor if a continuously present circuit is available.

Furthermore, it is also alternatively envisioned to replace the hydraulic motor by an electric motor. An electric motor may, for example, be preferably used as a motor unit if the vehicle is embodied in the manner of a hybrid vehicle. In such a hybrid vehicle, the drive of the vehicle is primarily provided by an electric motor for which electric current is generated by a generator which is driven by a diesel engine. Excess electric current can be fed into a battery here. In such a hybrid vehicle electric current is therefore present in any case in order also to supply the separate electric motor of the helical compressor with the necessary operating energy. The separate electric motor is preferably embodied as a three-phase motor which receives its operating energy via a power inverter from the DC voltage generated by the generator.

According to a further exemplary embodiment according to the invention, the helical compressor unit includes preferably three housing parts which are connected to one another without external lines by mounting them one next to the other, so that together they form the helical compressor unit. The housing parts are preferably embodied from cast metal. Within the housing parts it is possible to accommodate numerous functions in a space-saving fashion. Furthermore, this design eliminates all the external piping of the compressor functions.

A first housing part of the exemplary multi-component housing advantageously includes at least one intake nonreturn valve with a compressor helical arrangement connected downstream, with an oil pre-separator unit connected downstream, containing an oil sump with a slosh preventer, with a pressure relief unit connected downstream (for use when the unit is switched off). All these functional parts of the helical compressor unit can be efficiently integrated in a first, common housing part.

In a second housing part which is assigned or connected to the first housing part, the outflow contour of the helical compressor unit is preferably formed together with elements for returning oil from the oil sump, at least one oil filter with an optional oil thermostat and at least one oil inflow connector.

With the aforementioned two housing parts it is advantageously possible to combine a third housing part which preferably contains elements for accommodating a fine oil filter, elements for extracting oil, pressure holding valve elements and nonreturn valve elements.

In the helical compressor unit, which is preferably composed of the three abovementioned housing parts with respectively integrated components, it is possible to dispense with all the external and internal piping which is otherwise customary, in particular for relieving pressure when switching off, for returning oil from the fine precipitator, etc.

According to a further exemplary embodiment which improves the invention, there is a provision for the hydraulic motor to be coupled by a driver disk to the helical compressor unit in which the shaft ends of the hydraulic motor and helical compressor unit engage. The driver disk is damped and lubricated by an oil circuit or a continuous grease lubrication component. Using a damped driver disk of this type ensures particularly wear-free coupling of the hydraulic motor to the helical compressor unit. For this purpose, elastic couplings or rigid couplings are generally used provided there is no speed-changing drive via V-belts or a transmission. These coupling elements are subject to wear and permit only a rigid connection between the assembly containing the hydraulic motor and the assembly containing the helical compressor unit.

According to another exemplary embodiment which improves the invention, the oil circuit, which is necessary to cool the helical compressor unit, can be coupled via a heat exchanger to a thermostatically controlled cooling circuit of the vehicle. This measure allows a separate temperature control of the oil circuit for cooling the helical compressor unit to be entirely dispensed with. As a cooling circuit of the vehicle it is possible to use the cooling circuit for lubricating the vehicle shaft, differential, etc. or the engine cooling circuit. This also makes it possible to connect the heat exchanger directly to the helical compressor unit or alternatively to the drive assembly of the vehicle.

Other objects, advantages and novel features of the present invention will become apparent from the following detailed description of the invention when considered in conjunction with the accompanying drawings.

BRIEF DESCRIPTION OF THE DRAWINGS

Further measures which improve the invention are illustrated in more detail below together with the description of a preferred exemplary embodiment of the invention with reference to the figures, in which.

DETAILED DESCRIPTION OF THE DRAWINGS

Figure 1:
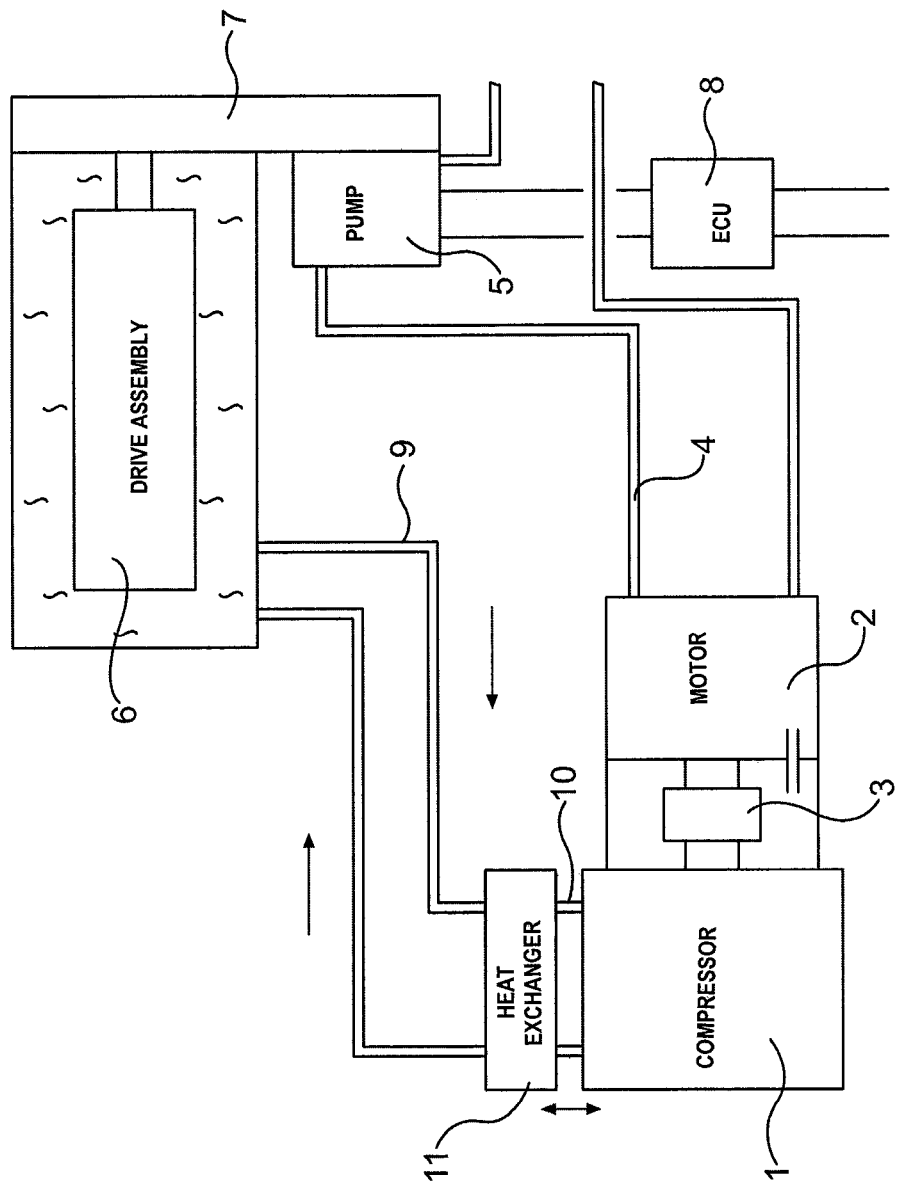
FIG. 1 is a block circuit diagram of a helical compressor with peripheral assemblies.

According to FIG. 1, the compressor, for example a helical compressor, includes a helical compressor unit 1 which is driven by a hydraulic motor 2. In this exemplary embodiment, the hydraulic motor 2 is coupled to the helical compressor unit 1 by a driver disk 3. The two shaft ends of the hydraulic motor 2 or helical compressor unit 1 engage in the driver disk 3. The driver disk 3 is damped and lubricated by an oil circuit (not illustrated here in detail). The hydraulic motor 2 may be connected directly by flanges to the helical compressor unit 1.

The exemplary hydraulic motor 2 is supplied with the pressure medium necessary for operation via an oil line 4 which is divided into a forward line and return line. An adjustable hydraulic pump 5 which feeds the oil line 4 may be used for this purpose. The drive of the hydraulic pump 5 is provided by a secondary output of the drive assembly 6 from the vehicle with an intermediately connected transmission 7, which is embodied here in the manner of a gear mechanism. The actuation of the adjustable hydraulic pump 5, i.e. the angular adjustment of the drive part which is used for this purpose, is carried out in accordance with an electronic controller unit 8. This arrangement ensures that the discharge rate of compressed air which is provided by the helical compressor unit 1 is independent of the rotational speed of the drive assembly 6 of the vehicle.

The helical compressor unit 1 is cooled in this exemplary embodiment by the cooling circuit 9 of the vehicle (not illustrated in detail). For this purpose the oil circuit 10 which is necessary to cool the helical compressor unit 1 is coupled via heat exchanger 11 to the thermostatically controlled cooling circuit 9 of the vehicle.

Figure 2:
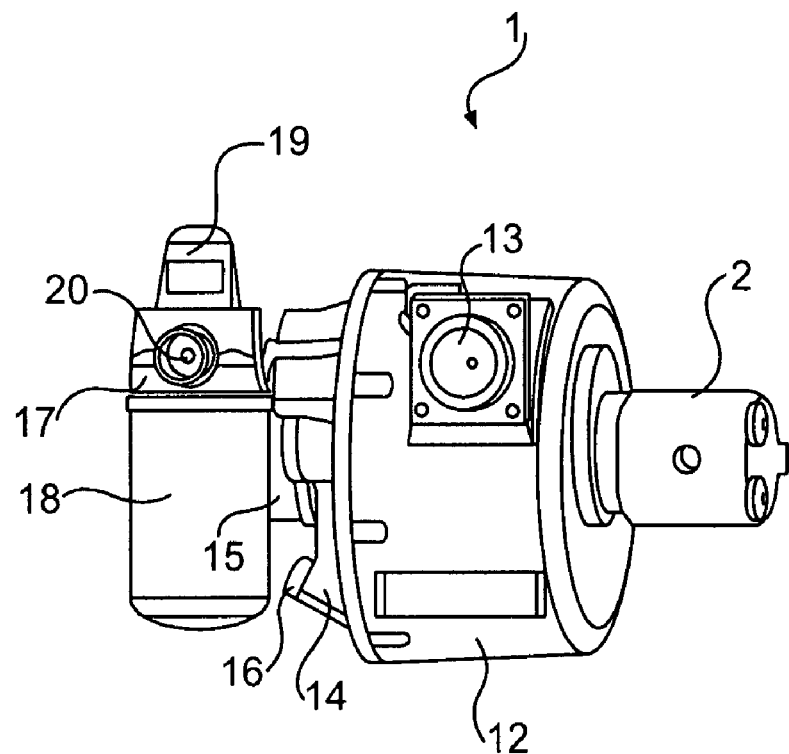
FIG. 2 is a perspective external view of a compact helical compressor.

FIG. 2 shows a compact helical compressor with a hydraulic motor 2 which is connected by flanges to the helical compressor unit 1, according to an exemplary embodiment of the invention. The helical compressor unit 1 is composed of a multi-component housing, with a first housing part 12 containing an intake nonreturn valve 13, with an internal compressor helical arrangement (not shown here) which is connected downstream, with an internal oil precipitator unit which is connected downstream, and may contain an oil sump with a slosh preventer, and with a pressure relief unit which is connected downstream. A second housing part 14 of the helical compressor unit 1 embodies the outflow contour of the helical compressor unit 1 and includes elements for returning oil from the oil sump of the first housing part 12 and an oil filter head 15. Adjacent to the oil filter head 15, an oil inflow connector 16 is arranged on the second housing part 14. A third housing part 17 is equipped with elements for accommodating a fine oil filter 18. Likewise, a pressure holding valve 19 and a nonreturn valve 20 are arranged on the third housing part 17. Those of skill in the art will understand that the conventional elements of helical compressors described herein can be changed with other equivalent conventional elements.

Figure 3:
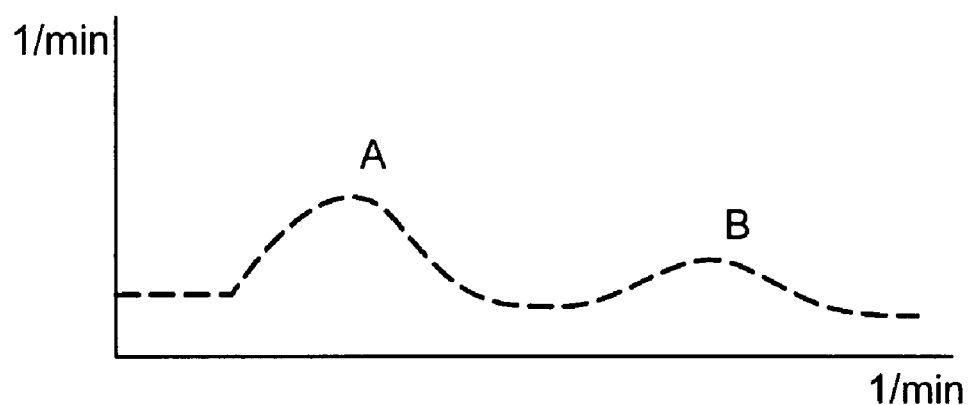
FIG. 3 is a graphic illustration of a two axis plot, showing an adaptation of the discharge rate of compressed air in accordance with demand by an appropriate control.

In the diagram according to FIG. 3, the discharge rate in l/min of the exemplary compact helical compressor of the type described above is illustrated plotted against the rotational speed l/min of the drive assembly of the vehicle. It is apparent that the discharge rate of compressed air can be provided for two main demand ranges A and B, independently of the rotational speed of the drive assembly. This is made possible, as described above in detail, by the control unit which ensures that the controllable hydraulic drive can be adjusted in accordance with demand.

The following list of reference numerals is provided to more clearly describe the exemplary embodiments of the invention shown in the drawings

LIST OF REFERENCE NUMERALS

1. Helical compressor unit
2. Hydraulic motor
3. Driver disk
4. Oil line
5. Hydraulic pump
6. Drive assembly
7. Transmission
8. Control unit
9. Cooling circuit
10. Oil circuit
11. Heat exchanger
12. First housing part
13. Intake nonreturn valve
14. Second housing part
15. Oil filter head
16. Inflow connector
17. Third housing part
18. Fine oil filter
19. Pressure holding valve
20. Nonreturn valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compact helical compressor for supplying a compressed air on-board system in a vehicle, comprising:
   a helical compressor unit;
   a motor unit having a controllable hydraulic drive, the motor unit being assigned solely to the helical compressor unit;
   a hydraulic motor of the hydraulic drive, the hydraulic motor being connected directly by flanges to the helical compressor unit;
   an adjustable hydraulic pump for supplying the hydraulic motor via an oil line with a pressure medium necessary for operation;
   a control unit for actuating the adjustable hydraulic pump and for adjusting a rotational speed of the motor unit causing the helical compressor unit to generate a predefined discharge rate of compressed air independently of a drive assembly of the vehicle; and
   a multi-component housing of the helical compressor unit having a first housing part containing an intake nonreturn valve with a compressor helical arrangement connected downstream and an oil precipitator unit connected downstream, connected with a neighboring second housing part containing an outflow contour of the helical compressor unit, and connected with a neighboring third housing part containing elements for accommodating a fine oil filter.

2. The compact helical compressor as claimed in claim 1, wherein the oil precipitator unit contains an oil sump with a slosh preventer, and a pressure relief unit connected downstream when in a switched off condition.

3. The compact helical compressor as claimed in claim 1, wherein the second housing part further contains elements for returning oil from the oil sump, at least one oil filter head, and at least one oil inflow connector.

4. The compact helical compressor as claimed in claim 1, wherein the third housing part further contains elements for extracting oil, a pressure holding valve and a nonreturn valve.

5. The compact helical compressor as claimed in claim 1, wherein the three housing parts are connected to one another without external lines by mounting them one next to the other, in order to form the helical compressor unit.

6. The compact helical compressor as claimed in claim 1, wherein the hydraulic motor is coupled directly to the helical compressor unit by a driver disk in which shaft ends of the hydraulic motor and of the helical compressor unit engage, and wherein the driver disk is damped and lubricated by one of an oil circuit and a continuous grease lubrication element.

\* \* \* \* \*